United States Patent Office 3,547,916
Patented Dec. 15, 1970

3,547,916
1-PHENYL-2-STYRYL-3,5-DIOXOPYRAZOLIDINES AND METHOD OF PRODUCING SAME
Franz Schatz, Theodor Wagner-Jauregg, and Ulrich Jahn, Zofingen, Switzerland, assignors to Siegfried Aktiengesellschaft, Zofingen, Switzerland, a corporation of Switzerland
No Drawing. Filed July 22, 1968, Ser. No. 746,236
Int. Cl. C07d 49/08
U.S. Cl. 260—240                                              15 Claims

ABSTRACT OF THE DISCLOSURE

This invention is directed to 1-phenyl-2-styryl-3,5-dioxopyrazolidines and the method of producing same by reacting the corresponding 1-phenyl-3,5-dioxopyrazolidine with a phenylacetaldehyde in the presence of a dehydrating agent.

---

This invention is directed to 1-phenyl-2-styryl-3,5-dioxopyrazolidines and the method of producing same. The compounds are produced by reacting the corresponding 1-phenyl-3,5-dioxopyrazolidine with a phenylacetaldehyde in the presence of a dehydrating agent.

The reaction is represented by the following equations:

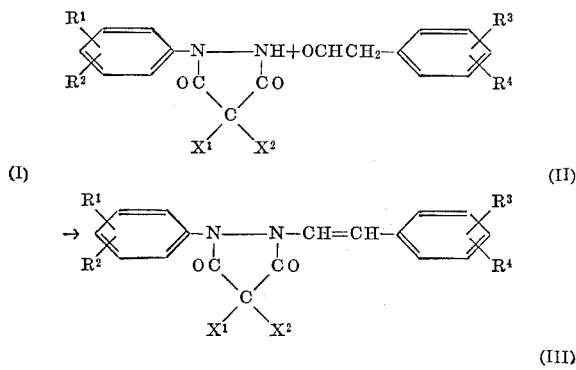

wherein $X^1$ and $X^2$ represent saturated or unsaturated aliphatic or cycloaliphatic or araliphatic residues which can be substituted by halogen atoms or hydroxyl radicals; $R^1$, $R^2$, $R^3$ and $R^4$ may independently be hydrogen, halogen, lower alkyl, halogenated lower alkyl, lower alkoxy, or sulfo groups.

The compounds of the invention represented by Formula III have pharmacological properties and are useful as antiphlogistic agents for the reduction or alleviation of swelling in mammals.

The reaction is preferably carried out in a solvent inert to the reactants and in the presence of heat. The reactants, namely, the 1-phenyl-3,5-dioxopyrazolidine and the phenylacetaldehyde, are reacted in the presence of a dehydrating agent such as water free formic acid, oxalic acid, phosphoric acid, polyphosphoric acids, phosphorous pentoxide, zinc chloride, and the like.

During the reaction of the phenylacetaldehyde with a 1-phenyl-3,5-pyrazolidine of the Formula I, with $X^2$ being hydrogen, compounds having the following formula may be formed as by-products:

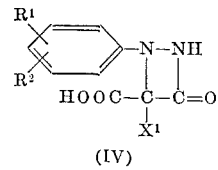

(IV)

$X^1$, $R^1$, and $R^2$ being as above defined.

A preferred group of compounds of the invention are represented by Formula III, wherein $R^1$, $R^2$, $R^3$, $R^4$ and $X^2$ are hydrogen and $X^1$ is lower alkyl or cycloalkyl, that is 1-phenyl-2-styryl-4 lower alkyl (or cycloalkyl)-3,5-dioxopyrazolidine. These compounds have excellent pharmacological properties and are particularly useful as antiphlogistic agents for the treatment of mammals to reduce or alleviate inflammation, edema, pain, fever and swelling. Such treatment may be carried out by intramuscularly injecting a solution in a suitable solvent, such as water, of the compounds or pharmaceutically acceptable salts thereof or by perorally administering uncoated or coated tablets or capsules containing the compounds or their salts and a suitable carrier such as mannitol, corn starch etc. The administration may also be performed with suppositories containing the compounds of the invention or their salts. The daily dosage may vary in a range of preferably 5–20 mg. per kg. weight of mammal.

In Table I below there are set forth results of various tests on animals of selected compounds of this preferred group. For the purposes of comparison there are also set forth in Table I comparable tests on the well-known antiphlogistic agent phenylbutazone. Each of the compounds has been arbitrarily assigned a substance number for identification and under the heading "$X^1$" is shown the lower alkyl or cycloalkyl group of the particular compound, $R^1$, $R^2$, $R^3$, $R^4$, and $X^2$ being hydrogen.

Under the heading "Toxicity" are shown the results of peroral administration of the compounds to rats and mice.

Under the heading "Rats' paw edema" are listed the antiphlogistic effects as determined by the aerosil and carrageenan rats' paw edema tests with the compounds being perorally administered.

The following column contains the $ED_{50}$ doses for prevention of the ultra-violet erythem by previous peroral administration to guinea pigs.

Under the heading "Collier test" are shown the antibradykinin effects on the guinea pig bronchospasm according to the method of Collier and Shorley with the compounds being intravenously administered.

Under the heading "Ulcerogenic effect" are listed the doses producing gastric ulcers as an undesirable side effect in 50% of rats treated by peroral administration of the compounds. For this test two different methods were used. According to "Method A" the compounds were twice administered to normally fed rats with an interval of 14 hours; the animals were killed 7 hours later and their stomach examined. According to "Method B" the compounds were once administered to starved rats which were killed 3½ hours later.

The literature references quoted in the table outline the methods which have been used.

As indicated in the headings of the table the compounds to be tested were administered as suspensions ("Susp.") and/or solutions ("Sol."). The suspensions were prepared by suspending the desired amount of the compound in a 5% aqueous suspension of gum acacia; the solutions were prepared by dissolving the compound in an aqueous solution of an equivalent amount of sodium hydroxide.

The values of toxicity and of the pharmacodynamic properties in the table represent the respective doses in milligrams per kilo weight of animal.

rator under reflux in toluol with 100% formic acid, in analogous manner described in Example 1. The mixture of the reaction products is separated by chromatography on neutral aluminum oxide. After washing the column with benzol, it is eluted with methylenechloride and with chloroform, and the solids from the eluate are recrystallized in benzol. Melting point: 117–120° C.

Calcd. for $C_{22}H_{24}N_2O_2$ (348.4), percent: C, 75.84; H, 6.94; N, 8.04. Found (percent): C, 75.96; H, 7.02; N, 7.61.

| Substance No. | $X^1$ | Melting point, °C. | Toxicity [a] $DL_{50}$ | | | Rats' paw edema $ED_{50}$ | | | | UV-ery-them [d] $ED_{50}$ Sol. | Collier test [e] $ED_{50}$ Sol. | Ulcerogenic effect [f] $ED_{50}$ | | | |
|---|---|---|---|---|---|---|---|---|---|---|---|---|---|---|---|
| | | | Rats | | Mice | Aerosil [b] | | Carrageenan [c] | | | | Method A | | Method B | |
| | | | Susp. | Sol. | Sol. | Susp. | Sol. | Susp. | Sol. | | | Susp. | Sol. | Susp. | Sol. |
| 820 | $C_2H_5$ | 125–126 | 580 | 480 | | 150 | 45 | 75 | 115 | | >2,5 | 125 | 175 | 240 | 150 |
| 700 | n-$C_3H_7$ | 142–144 | 1,100 | 160 | >500 | 160 | 100 | 70 | 90 | | 1,3 | 140 | 90 | 190 | 80 |
| 826 | i-$C_3H_7$ | 154–155 | >2,000 | 650 | [g] 680 | >200 | [g] 60 | 100–400 | 56 | | 0,22 | ≫200 | 150 | >2,000 | 650 |
| 670 | n-$C_4H_9$ | 155 | >3,000 | 230 | [g] 900 | 90 | 51 | 200 | 50 | 15 | 0,5 | ≫200 | 50 | >400 | 40 |
| 843 | n-$C_5H_{11}$ [h] | 117–120 | | | | 165 | | 150 | | | | | | | |
| 842 | i-$C_5H_{11}$ [i] | 145 | | | 350 | 100–200 | 82 | 50–200 | <50 | | | | | | |
| 897 | $C_5H_9$ | 159–162 | | | | [g] 80 | 14 | 240 | 120 | 10 | 0,24 | | | | |
| Phenylbutazone | | | 700 | 760 | 880 | 30 | 68 | 45 | 50 | 10 | 3,1 | 86 | 105 | 63 | 44 |

[a] Litchfield and Wilcoxon, J. Pharmacol. 96, 99 (1949).
[b] Wagner-Jauregg and Jahn, Helv. Physiol. Acta 21, 65 (1963).
[c] Winter, Proc. Soc. Exp. Biol. Med. 111, 544 (1962).
[d] Winder et al., Arch. Int. Pharmacodyn. 116, 261 (1958).
[e] Collier and Shorley, Brit. J. Pharmacol. 15, 601 (1966).
[f] Wilhelmi, as quoted by Domenjoz, Ann. N.Y. Acad. Sc. 86, 263 (1960)
[g] About.
[h] $(CH_3)_2CHCH_2CH_2$—.
[i] Cyclopentyl.

EXAMPLE 1

1-phenyl-2-styryl-4-n-butyl-3,5-dioxopyrazolidine 12 g. (0.1 mol) freshly distilled phenylacetaldehyde are dissolved in 400 ml. toluol and mixed with 25.5 g. (0.11 mol) 1-phenyl-4-n-butyl-3,5-dioxopyrazolidine and 4.6 g. (about 0.1 mol) waterfree formic acid. The mixture is boiled under reflux for 24 hours in a vessel equipped with a water separator.

When 10.5 ml. water have separated the reaction is complete. The reaction mixture is cooled and the resulting precipitate is separated by filtration. The precipitate is recrystallized from benzene until the melting point is constant, to obtain the product having a melting point of 154–155° C.

Calcd. for $C_{21}H_{22}N_2O_2$ (334.4), percent: C, 75.42; H, 6.64; N, 8.37. Found (percent): C, 75.42; H, 6.71; N, 8.51.

As a by-product 4-butyl-1-phenyldiazetidone-(3)-carbonic acid-(4) can be isolated from the benzene-insoluble residue of the precipitate; its solubility in aqueous sodium-bicarbonate solution can also be used to separate it. Melting point after recrystallization in acetic ester: 175–177° C.

Calcd. for $C_{13}H_{16}N_2O_3$ (248.3), percent: C, 62.89; H, 6.50; N, 11.28. Found (percent): C, 62.85; H, 6.44; N, 11.31.

EXAMPLE 2

1-phenyl-2-styryl-4-n-propyl - 3,5 - dioxopyrazolidine is made analogous to Example 1 by using an equivalent amount of 1-phenyl-4-n-propyl-3,5-dioxopyrazolidine instead of 1-phenyl-4-n-butyl-3,5-dioxopyrazolidine. The reaction product precipitates when the toluol solution is concentrated to half its volume and is recrystallized from methanol. Melting point: 142–144° C.

Calcd. for $C_{20}H_{20}N_2O_2$ (320.4), percent: C, 74.97; H, 6.29; N, 8.75. Found (percent): C, 75.21; H, 6.51; N, 8.74.

The corresponding 4-isopropyl derivative was also produced in the same manner which melts at 154–155° C. after recrystallization in ethanol.

EXAMPLE 3

1-phenyl-2-styryl-4-n-pentyl-3,5-dioxopyrazolidine 1-phenyl-4-n-pentyl-3,5-dioxopyrazolidine and phenylacetaldehyde are boiled for 36 hours in the water sepa-

EXAMPLE 4

1-phenyl-2-styryl-4-n-ethyl - 3,5 - dioxopyrazolidine is made analogous to Example 1 by using an equivalent amount of 1-phenyl-4-ethyl-3,5-dioxopyrazolidine. The product is recrystallized in ethanol. Melting point: 125–126° C.

Calcd. for $C_{19}H_{18}N_2O_2$ (306.4), percent: C, 74.50; H, 5.92; N, 9.15. Found (percent): C, 74.26; H, 6.30; N, 9.11.

EXAMPLE 5

1 - phenyl - 2 - (p-methyl)-styryl-4-isopropyl-3,5-dioxopyrazolidine is made analogous to Example 1 by using an equivalent amount of 1 - phenyl-4-isopropyl-3,5-dioxopyrazolidine instead of 1-phenyl-4-n-butyl-3,5 dioxopyrazolidine and an equivalent amount of p-tolylacetaldehyde instead of phenylacetaldehyde. The precipitate is recrystallized in ethanol to yield the product having a melting point of 175–177° C.

Calcd. for $C_{21}H_{22}N_2O_2$ (334.4), percent: C, 75.40; H, 6.63; N, 8.38. Found (percent): C, 75.56; H, 6.83; N, 8.24.

EXAMPLE 6

1 - phenyl - 2 - styryl - 4 - cyclopentyl - 3,5 - dioxopyrazolidine is made analogous to Example 1 by using an equivalent amount of 1-phenyl-4-cyclopentyl-3,5-dioxopyrazolidine. The product is recrystallized in ethanol.

Calcd. for $C_{22}H_{22}N_2O_2$ (346.4), percent: C, 76.27; H, 6.40; N, 8.09. Found (percent): C, 76.49; H, 6.65; N, 7.68.

The following are additional examples of compounds of the invention:

1-phenyl-2-(p-chloro)-styryl-4-isopropyl-3,5-dioxopyrazolidine
1-phenyl-2-(p-bromo)-styryl-4-isopropyl-3,5-dioxopyrazolidine
1-phenyl-2-(p-methoxy)-styryl-4-isopropyl-3,5-dioxopyrazolidine
1-(p-bromo)-phenyl-2-styryl-4-isopropyl-3,5-dioxopyrazolidine
1-(m-sulfo)-phenyl-2-styryl-4-isopropyl-3,5-dioxopyrazolidine
1-phenyl-2-styryl-4-sec.-butyl-3,5-dioxopyrazolidine
1-phenyl-2-styryl-4-isopentyl-3,5-dioxopyrazolidine 1-phenyl-2-styryl-4-cyclohexyl-3,5-dioxopyrazolidine
1-phenyl-2-styryl-4-cyclopenten-(1)-yl-3,5-dioxopyrazolidine
1-phenyl-2-styryl-4-cyclopentyl-3,5-dioxopyrazolidine
1-phenyl-2-styryl-4-cyclohexyl-3,5-dioxopyrazolidine
1-phenyl-2-styryl-4-(2-chloroethyl)-3,5-dioxopyrazolidine
1-phenyl-2-styryl-4-(1-hydroxy-2-phenyl ethyl)-4-n-butyl-3,5-dioxopyrazolidine
1-(p-trifluoromethyl phenyl)-2-styryl-4-isopropyl-3,5-dioxopyrazolidine

We claim:

1. A compound having the following formula:

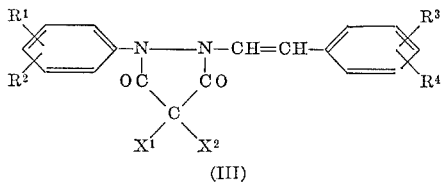

(III)

wherein $X^1$ and $X^2$ are independently selected from the class consisting of hydrogen, lower alkyl, cycloalkyl, phenylalkyl, halogenated lower alkyl, and cycloalkenyl, and $R^1$, $R^2$, $R^3$ and $R^4$ are independently selected from the class consisting of hydrogen, halogen, lower alkyl, halogenated lower alkyl, lower alkoxy and sulfo.

2. A compound according to claim 1, wherein $R^1$, $R^2$, $R^3$ and $R^4$, and $X^2$ are hydrogen.

3. A compound according to claim 2, wherein $X^1$ is lower alkyl.

4. A compound according to claim 3, wherein $X^1$ is ethyl.

5. A compound according to claim 3, wherein $X^1$ is n-propyl.

6. A compound according to claim 3, wherein $X^1$ is i-propyl.

7. A compound according to claim 3, wherein $X^1$ is butyl.

8. A compound according to claim 3, wherein $X^1$ is pentyl.

9. A compound according to claim 3, wherein $X^1$ is i-pentyl.

10. A compound according to claim 3, wherein $X^1$ is cyclopentyl.

11. A method of producing the compound of claim 1, comprising heat reacting a compound having the following formula:

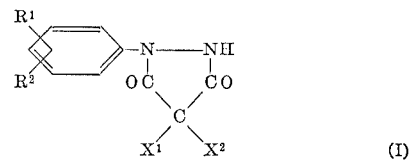

(I)

with a compound having the following formula:

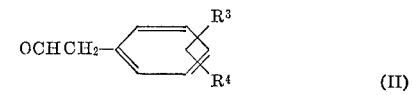

(II)

in an inert solvent and in the presence of a dehydrating agent, $X^1$ and $X^2$ being selected from the class consisting of hydrogen, lower alkyl, cycloalkyl, phenylalkyl, halogenated lower alkyl, and cycloalkenyl, and $R^1$, $R^2$, $R^3$ and $R^4$ being independently selected from the class consisting of hydrogen, halogen, lower alkyl, halogenated lower alkyl, lower alkoxy and sulfo.

12. A method according to claim 11, wherein $R^1$, $R^2$, $R^3$, $R^4$, and $X^2$ are hydrogen and $X^1$ is selected from the class consisting lower alkyl and cycloalkyl.

13. A method according to claim 11, wherein the inert solvent is toluol.

14. A method according to claim 13, wherein the dehydrating agent is selected from the class consisting of water free formic acid, oxalic acid, phosphoric acid, polyphosphoric acids, phosphorous pentoxide and zinc chloride.

15. A method for producing the compound of claim 1, comprising heat reacting a 1-phenyl-3,5-dioxopyrazolidine with a phenyl-acetaldehyde in an inert solvent in the presence of a dehydrating agent.

References Cited

Buchi et al., Helv. Chim. Acta. vol. 36, pages 75 to 85 (1953).

JOHN D. RANDOLPH, Primary Examiner

U.S. Cl. X.R.

260—239, 310; 424—273